United States Patent [19]

Neogi

[11] 3,876,581
[45] Apr. 8, 1975

[54] HYDROPHILIC POLYMER COMPOSITION FOR PROSTHETIC DEVICES

[75] Inventor: Amar N. Neogi, Seattle, Wash.

[73] Assignee: Erickson Polymer Corporation, Seattle, Wash.

[22] Filed: Oct. 10, 1972

[21] Appl. No.: 296,270

[52] U.S. Cl............... 260/29.7 RP; 260/29.7 NR; 260/29.7 W; 260/895; 260/901
[51] Int. Cl......................... C08f 45/24; C08f 41/10
[58] Field of Search............ 260/29.6 NR, 29.6 WB, 260/29.7 RP, 29.7 NR, 29.7 W, 260/29.6 H, 29.7 H, 80.72, 80.75

[56] References Cited
UNITED STATES PATENTS

| | | | |
|---|---|---|---|
| 3,220,960 | 11/1965 | Wichterle | 260/2.5 |
| 3,496,254 | 2/1970 | Wichterle | 264/1 |
| 3,503,942 | 3/1970 | Seiderman | 260/80.75 |
| 3,532,679 | 10/1970 | Steckler | 260/80.72 |
| 3,621,079 | 11/1971 | Leeds | 260/885 |
| 3,647,736 | 3/1972 | Ewell | 260/29.6 WB |
| 3,699,089 | 10/1972 | Wichterle | 260/86.1 |
| 3,721,657 | 3/1973 | Seiderman | 260/80.72 |
| 3,728,315 | 4/1973 | Gustafson | 260/80.75 |

*Primary Examiner*—Melvin Goldstein
*Assistant Examiner*—E. A. Nielsen
*Attorney, Agent, or Firm*—Christensen, O'Connor, Garrison & Havelka

[57] ABSTRACT

Hydrophilic polymer compositions having good properties for fabrication in the dehydrated state and which become soft and resilient yet structurally stable in the hydrated state are provided. The polymer composition comprises a copolymer or terpolymer or an hydroxyalkyl acrylate or methacrylate polymerized with itself, with one or more hydrophilic vinyl monomers or a mixture of hydrophilic and hydrophobic monomers in the presence of a crosslinking agent and a suitable polymerization catalyst. To minimize stress and distortions upon hydration the polymer structure contains a water soluble substance which is substantially removable from the polymer matrix upon exposure to water whereby an exchange of the water soluble substance and water take place. This exchange minimizes stresses and distortions in the polymer matrix due to entry of water therein.

14 Claims, No Drawings

HYDROPHILIC POLYMER COMPOSITION FOR PROSTHETIC DEVICES

FIELD OF THIS INVENTION

This invention relates to a polymeric composition of matter and more particularly to a hydrophilic polymer useful in the preparation of contact lenses and other prosthetic devices.

One variant form of this invention relates to polymer compositions suitable for prosthetic devices useful in an aqueous moist environment wherein stress and distortion due to absorption of water into the polymer matrix must be minimized.

This invention further relates to the manufacture of prosthetic and other devices wherein the device is formed to the desired shape and then hydrated with a minimum of stress and distortion.

This invention relates specifically to a novel composition of matter for contact lenses and other prosthetic devices which are subject to minimum rejection by body tissues and which have properties permitting machining and polishing in the nonhydrated state. Addition of an additive disclosed herein to the polymer matrix permits hydration of the finished device with a minimum of distortion and swelling caused by entry of water into the polymer matrix.

PRIOR ART

Various types of hydrophilic materials have been proposed heretofore for use as prosthetic devices and particularly for plastic contact lenses. Hydrogels formed from materials such as hydroxyalkyl methacrylates which contain hydrophilic groups with an affinity for water and aqueous solvents in which a sparingly cross-linked hydrogel structure is provided have been used to form such lenses. It has been found, however, that contact lenses produced from such hydrogels which has a soft jelly-like elastic consistency are difficult to apply and remove from the eyes. Occasional scratching and abrasions result from the forceful nature of the operation necessary to remove such a lens from the eyeball. This is due to the fact that this prior art type of contact lenses does not ride on the cornea of the eye on a layer of tears but rather attaches themselves to the epithelium of the cornea in a manner which alters the metabolic outflow of fluid from the anterior chamber of the eye.

Another form of hydrophilic plastic contact lenses has been proposed in U.S. Pat. No. 3,503,942 wherein the hydrophilic polymer used to make the lenses is prepared from a mixture of about 50 to about 95% by weight of an hydroxyalkyl acrylate of methacrylate, a minor amount up to about 35% by weight of an alkyl acrylate or methacrylate and from about 1 to about 50% by weight of a cross-linking monomer. While providing an alternative material for use in contact lenses which exhibits improved water wetting characteristics, the polymer structure so formed exhibits brittleness during the cutting and fabricating operations necessary for formation of contract lenses and does not polish well. Lenses prepared from this material deteriorate with time and during usage such that the lenses have a tendency to flatten out and become distorted, thus altering the corrective power and other lens parameters. Lenses formed from this material also tended to dry quickly when exposed to air and exhibit in a relatively low strength during handling after hydration.

It is also known to provide a contact lens having a hard center area combined with a relatively softer peripheral skirt shaped to conform with the surface of the eyeball. British Pat. No. 1,045,065 issued to John Trevor DeCarle discloses the concept of having a center lens comprised of the usual materials utilized for conventional hard plastic lenses, such as acrylic plastics of high optical quality, surrounded by a softer polymer skirt. This reference indicates that epoxy resins may advantageously be used as the material of the lens. The skirt material is chosen from a compatible polymer such as soft epoxy plastics, polyvinyl chloride, copolymers of vinyl chloride and vinyl acetate and fluorinated copolymers of ethylene with propylene and polyester plastics.

Similarly, U.S. Pat. No. 3,619,044 to Kamath discloses a rigid oxygen permeable contact lens formed of the plastic material poly (4-methylpentene-1) with a soft swellable plastic grafted on the poly (4-methylpentene-1) lens as the edge of the lens.

When it was attempted to combine the teachings of the prior art to provide a contact lens having a hard center and a soft hydrophilic skirt, it was discovered that substantial residual stresses and resultant distortions were encountered upon hydration. When the skirt material was made of the conventional well-known hydrophilic materials utilized in the prior art to form hydrophilic soft contact lenses and combined with the well-known hard contact lens materials for the center lens portion an acceptable product could not be obtained. Severe distortion and occasional complete disintegration of the composite lenses resulted upon hydration.

It is known from the prior art that a hydrophilic contact lens can be made by molding cross-linked copolymer of a hydroxyalkyl acrylate and an alkyl acrylate into the desired shape. A hydrophilic contact lens can be obtained by hydrating the molded shape. However, the prior art materials are very difficult if not impossible to fabricate into shapes requiring cutting, grinding and polishing steps to form the finished shape. The prior art hydrogel containing only a cross-linking agent and only hydroxyalkyl acrylate or methacrylate has insufficient strength in the dehydrated form and the prosthetic device formed by polymerization in aqueous media is not amenable to further mechanical manipulations such as grinding and which are essential in the manufacture of optically correct contact lenses.

Copolymerization of a hydroxyalkyl acrylate with an alkyl acrylate in a hard rigid form results in a copolymer which is very brittle and mechanical operation such as machining, cutting and polishing are extremely difficult, and also results in a polymer having a relatively lower water content on hydration.

The present invention provides a novel material useful for forming prosthetic devices and other objects comprising cross-linked copolymers or terpolymers of an hydroxyalkyl acrylate or methacrylate with one or more hydrophilic vinyl monomers or a mixture of hydrophilic and hydrophobic monomers. Stresses upon hydration of the polymerized shape may be minimized by adding a water soluble polymer compatible material. These copolymers or terpolymers are relatively hard and rigid in the dehydrated state but are reasonably easy to fabricate by known techniques including nonaqueous cutting, polishing, grinding and other finishing operations since the polymers have adequate strength in the dehydrated condition. Since the resin in its relatively hard and rigid dehydrated form may contain some other material in solid solution and since such materials can be selected to give more toughness and reduce brittleness, the machining, cutting, drilling operations are rendered relatively simple and easy.

Moreover, hydration of the fabricated material results in a prosthetic device which contains larger amounts of water than if the co-monomer was aa hydrophobic one like an alkyl acrylate, because the co-monomer itself is hydrophilic. When the polymer matrix contains a water soluble substance hydration of the polymer results in release of the water-soluble ingredient into the water and replacement thereof by water and hence diminishes the strain and distortion due to swelling and reduces the build-up of internal stresses within the polymer shape. Since the percentage increase in volume due to swelling is much less, the thickness of the fabricated hydrated material is also less than if the water-soluble ingredient was absent. The smaller thickness and lesser internal stress offers more pliability and easy handling, reducing the danger of tearing the device apart.

These and other objects and attributes of this invention will become more readily apparent from an evaluation of the following detailed description.

EXAMPLE I

In seeking to form a lens with a hard center and a softer edge, a mixture of 60% methyoxyethyl methacrylate, and 2% of 1,5-divinyloxy-3-oxapentane was co-polymerized with 38% hydroxyethyl methacrylate in the presence of azobisisobutyronitrile (AIBN) as catalyst in a polyethylene tube flushed with nitrogen. The tube was heated to 40°C. and maintained there for a period of 30 hours. The resulting rod was cured at 60°C. for 10 hours. This rod was then taken out and turned down to diameter of 7 mm. A mixture of 20% methoxyethyl methacrylate and 77% hydroxyethyl methacrylate with 2% of 1,5-divinyloxy-3-oxapentane and 1% AIBN was then polymerized at 40°C. under nitrogen around the rod formed above for 30 hours. The composite rod was then further cured at 60°C. for 10 hours. A lens was cut from this material and subsequently placed in distilled water for hydration. The lens shown flattening and distortion of the edge. The curvature of the edge portion was significantly altered as compared to the curvature prior to hydration. The structure was rejected due to the sever distortion and stresses between the center portion and the skirt. The center portion exhibited excellent optical and mechanical properties in the hydrated state and is an excellent material for manufacture of soft hydrophilic contact lenses and other prosthetic devices which do not have the hard-soft structure.

Several other trials using composite blanks having various center materials comprised of 30 to 70% methoxyethyl methacrylate with 2% cross-linking agent and the remainder of the system beind hydroxyethyl methacrylate with a peripheral edge material consisting of 65 to 95% hydroxyethyl methacrylate with 2% cross-linking agent and the remainder being methoxyethyl methacrylate with AIBN catalyst resulted in devices similar to that set forth above which had excellent optical properties but were inadequate due to stresses and distortion caused by hydration. Several of the lenses so manufactured shattered upon hydration, and the remainder of the lenses showed a substantial distortion to the extent of being unacceptable. It was observed that this composition of matter when used as a homogeneous polymer material for soft hydrophilic lenses exhibited substantially improved properties over the prior art compositions including ease of fabrication, polish and stability on usage but was unworkable as a hard-soft contact lens due to distortion upon hydration.

It was discovered that an acceptable composite lens could be formed by the inclusion of a water soluble solid substance within the polymer matrix prior to hydration resulting in little or no distortion and stress of the polymer matrix upon hydration. The following examples are representative of laboratory results demonstrating successful formation of a composite contact lens from hydrophilic polymer materials.

EXAMPLE II

A 7 mm. diameter rod comprising a cross-linked copolymer of methoxyethyl methacrylate (40%) and hydroxyethyl methacrylate (58%) cross-linked with 2% of 1,5-divinyloxy-3-oxapentane as a cross-linking agent copolymerized with AIBN as catalyst was formed as described above. A mixture of 30% polyethylene glycol, 15.5% methoxyethyl methacrylate and 52.4% hydroxyethyl methacrylate with 2% of 1,5-divinyloxy-3-oxapentane in the presence of 0.1% AIBN as a catalyst was copolymerized around the previously formed rod at 40°C. for 30 hours and the composite rod was subsequently cured at 60°C. for 10 hours. The composite rod was turned down to a diameter of 14 mm. and cut into cylindrical segments from which contact lenses were fabricated using non-aqueous grinding and polishing techniques well known in the art. Upon hydration, hard-soft lenses resulted with no distortion of the radii of curvature as ground prior to hydration. The lenses had a water content in the central portion of 17% and a water content of 25% in the outer portion, measured in terms of linear increase in dimensions.

EXAMPLE III

Around a 6 mm. rod of a cross-linked copolymer of methoxyethyl methacrylate (95%) and hydroxyethyl methacrylate (2%) cross-linked with 3% of ethyleneglycol dimethacrylate was polymerized a mixture of 40% polyethylene glycol, 12% methoxyethyl methacrylate, 46% hydroxyethyl methacrylate and 1.5% ethyleneglycol dimethacrylate in the presence of 0.5% AIBN at 42°C. for 24 hours. The composite rod was cured at 60°C. for 12 hours. The material was turned down to a rod from which a lens was fabricated. On hydration a lens resulted with a comparatively harder center and softer edge. The edge had a water content of about 38% while the interior portion contained 1.9% by weight water. No distortion nor stress of the softer edge structure was observed.

EXAMPLE IV

Around a rod (6 mm. diameter) of a cross-linked copolymer of methoxyethyl methacrylate (20%), hydroxyethyl methacrylate (78%) and 1,5-divinyloxy-3-oxapentane (2%) was polymerized a mixture of polyethylene glycol (10%), methoxyethyl methacrylate (9%), and hydroxyethyl methacrylate (81%) along with 2 g. of 1,5-divinyloxy-3-oxapentane per 100 g. of mixture and 0.5 g. AIBN per 100 g. of mixture at 45°C. for 48 hours. The composite rod was cured at 60°C. for 10 hours. The material was turned down to a diameter of 14 mm. and lenses were fabricated. The lens on hydration resulted in a hard-soft lens having a water content in the center of 25% and a water content in the edge of 34%, measured in terms of linear increase in dimensions. No distortion nor stress was observed in either the center or edge zones of the lens.

EXAMPLE V

Around a rod (6 mm. diameter) of a cross-linked copolymer of methoxyethyl methacrylate (20%), hydroxyethyl methacrylate (76.5%), 1,5-divinyloxy-3-oxapentane and a monomer derived from allylamine and a reactive dye (I.C.I. America's Procion Brilliant Blue) was polymerized a mixture of polyethylene glycol (10%), methoxyethyl methacrylate (9%), and hydroxyethyl methacrylate (81%) along with 2 g. of 1,5-divinyloxy-3-oxapentane per 100 g. of mixture and 0.5 g. AIBN per 100 g. of mixture at 45°C. for 48 hours. The composite rod was cured at 60°C. for 10 hours. The material was turned down to a diameter of 14 mm. and a lens was fabricated. The lens on hydration resulted in a hard-soft lens having a center water content of 25% and an edge water content of 34%, measured in terms of linear increase in dimensions. No distortion nor stress was observed in either the center or edge zones of the lens. The lens had a transparent blue center portion and an uncolored edge portion.

EXAMPLE VI

The lens as described in Examples 1–3 was formed except that the surrounding polymerization mixture contained 1.5 grams per 100 grams of mixture of a monomer derived from allylamine and a reactive dye (Procion Dye Brilliant Blue). A hydrated hard centered, soft skirted lens was formed having a transparent and uncolored central portion with an unstressed and undistorted colored peripheral skirt.

EXAMPLE VII

Lenses having a hydrophobic center and a soft hydrophilic edge were formed following the steps outlined in Examples 1–3 above by substituting a 6 mm. central rod made of methyl methacrylate (99%) polymerized with ethyleneglycol dimethacrylate (1%). These lenses exhibited a hard center and softer peripheral edge without observable stresses or distortions and provided for greater fluid circulation due to the hydrophobic center.

EXAMPLE VIII

A 14 mm. rod was obtained by the polymerization of a mixture containing 2-hydroxyethyl methacrylate (56%), methoxyethyl methacrylate (14%), polyethyleneglycol Mol. Wt. 6000 (30%) along with 2 g./100 g. of 1,5-divinyloxy-3-oxapentane and 0.5 g./100 g. of AIBN as catalyst at 42°C. for 24 hours and further curing at 60°C. for 10 hours. A 6 mm. hole was drilled at the center and a mixture of 2-hydroxyethyl methacrylate (58%), methoxyethyl methacrylate (40%), 1,5-divinyloxy-3-oxapentane (2%) and 0.5 g. of AIBN per 100 g. of mixture was polymerized therein at 40°C. for 24 hours with a further curing for 10 hours at 60°C. A lens was cut from the material which upon hydration gave a hard-soft lens with a hardness ratio from the center to the edge in terms of water content of 2:1.

The following examples show the usage of a hydrated, hydrophilic cross-linked copolymer or terpolymer having a water absorption equilibrium in the range of 5 to 40% by weight of the unhydrated polymer to form unstressed prosthetic devices. These polymers are polymerized from a mixture of a hydroxy alkyl acrylate or methacrylate present in the range of 5 to 95% by weight, one or more compatible hydrophilic monomers present in an amount up to 90% by weight in the presence of a cross-linking agent and up to about 50% by weight of a water soluble, compatible, inert substance. The water soluble substance usually does not enter into the polymerization but may become, at least in part, associated with the polymer structure as by chain transfer therein or by other bonding mechanisms.

EXAMPLE IX

A mixture containing ten grams of 2-hydroxyethyl methacrylate, containing about 1.2% methacrylic acid, one gram of methoxyethyl methacrylate and 150 milligrams of 1,5-divinyloxy-3-oxapentane was polymerized in a nylon tube at 45°C., using 0.1 g. of benzoyl peroxide initiator. The resulting polymer was relatively brittle but upon careful machining and handling a contact lens was formed by use of non-aqueous grinding and polishing techniques well known to the prior art. Upon hydration a contact lens resulted having excellent optical and mechanical properties. The lens diameter increased 26% during the hydration procedure which was carried out at room temperature (about 21°C.) by immersing the lens in water for 48 hours. 38.5% by weight water was absorbed in the hydration step. A soft hydrophilic contact lens of excellent optical and mechanical properties resulted.

EXAMPLE X

A mixture containing ten grams of 2-hydroxyethyl methacrylate containing about 1.2% methacrylic acid, one gram of methoxyethyl methacrylate, 150 milligrams of 1,5-divinyloxy-3-oxapentane, 100 milligrams of benzoyl peroxide and one gram of polyethylene glycol (molecular weight of about 4000) was polymerized in a nylon tube at 45°C. A contact lens was readily formed by cutting the polymerized rod transversely, grinding and polishing the resulting discs by non-aqueous contact lens grinding procedures well known to the prior art. The lenses so formed were hydrated in water at 65°C. for 48 hours., the percentage change in diameter was 19% at room temperature after hydration. When the lenses were weighed and then completely dehydrated it was found that about 38.5% by weight water was contained in the polymer matrix. Substantially all of the polyethylene glycol had been leached out by the water in the hydrating step.

It was apparent from the difference in the physical properties that the presence of the polyethylene glycol substantially reduces the brittle nature of the dehydrated polymer and makes fabrication procedures substantially easier in the unhydrated polymer.

To demonstrate the relative brittleness properties of the material formed in Examples IX and X above, a drop shatter test was performed on both materials before hydration. This test was performed by using several 5/8 inch diameter rods having a length of 2 and 4 inch which were dropped from various increasing heights to a concrete floor until the rod shattered. The test results are set forth in Table I.

TABLE I

|  | Length | Height of drop to shatter | Number of pieces |
|---|---|---|---|
| Example VIII (No polyoxyethylene glycol) | 2" | 43" | 6 |
|  | 2" | 29" | 4 |
|  | 4" | 29" | 8 |
|  | 4" | 32" | 11 |
| Example IX (With polyoxyethylene glycol) | 2" | 52" | 3 |
|  | 2" | 64" | 3 |
|  | 4" | 37" | 3 |
|  | 4" | 48" | 3 |

These test results demonstrate a comparative measure of the fragility of the rods made from the unhydrated polymers of 2-hydroxyethyl methacrylate copolymerized with methoxyethyl methacrylate in the presence of a cross-linking agent, one of the groups of rods having polyethylene glycol present in a minor amount.

The presence of the polyethylene glycol also has a substantial effect upon the change in size of the polymer shapes upon hydration. The elongation or change in diameter upon hydration for the polymer material itself in Example IX was 26%. The elongation or change in diameter upon hydration of the shaped polymer material in Example X containing approximately 8.25% by weight polyethylene glycol was only 19%. By using higher amounts of polyethylene glycol or equivalent materials in the polymer matrix the elongation of the polymer upon hydration can be further reduced or eliminated entirely. Example XXIV below further demonstrates this phenomenon wherein a polymer formed much like Example X but having approximately 26.5% polyethylene glycol by weight before hydration changed only 8% in diameter.

EXAMPLE XI

To demonstrate the effect of usage of the hydrophilic alkoxyl alkyl methacrylate on the water absorbed into the polymer matrix a polymer was prepared using the following ingredients and polymerized under the conditions set forth in Example IX.

| | |
|---|---|
| 2-hydroxyethyl methacrylate | 10 grams |
| methyl methacrylate | 1 gram |
| 1,5-divinyloxy-3-oxapentane | 150 milligrams |
| Benzoyl Peroxide | 100 milligrams |

The water content of the polymer prepared according to Example IX was 38.5% by weight at equilibrium. The water content of the polymer prepared according to this example using the composition set forth above with a hydrophobic monomer (methyl methacrylate) replacing the hydrophilic monomer (alkoxyalkyl methacrylate) of Example IX was 32% by weight at equilibrium.

EXAMPLE XII

To demonstrate usage of the inert water soluble substance in other copolymer systems, another copolymer was made by copolymerizing the following mixture under the conditions set forth in Example IX.

| | |
|---|---|
| 2-hydroxyethyl methacrylate | 10 grams |
| n-vinyl pyrrolidone | 1 gram |
| 1,5-divinyloxy-3-oxapentane | 150 milligrams |
| Benzoyl Peroxide | 100 milligrams |
| Carbowax 4000 | 1 gram |

Carbowax 4000 is a trademark used by the Union Carbide Corporation of 270 Park Avenue, New York, N.Y. 10017, for their polyethylene glycols having an average molecular weight of approximately 4000. Fabrication of contact lenses and subsequent hydration for 48 hours showed an increase in diameter by swelling of 26%. The water content was determined by drying the hydrated copolymer and found to be 34.5% by weight. The copolymer in its dehydrated state containing the Carbowax 4000 was easily machinable and readily ground and polished using non-aqueous fabrication techniques well known in the art of contact lens manufacture.

EXAMPLE XIII

The following mixture was polymerized in a nylon tube under nitrogen at 45°C. for 24 hours.

| | |
|---|---|
| 2-Hydroxyethyl methacrylate | 8 grams |
| Hydroxypropyl methacrylate | 2 grams |
| 1,5-divinyloxy-3-oxapentane | 150 milligrams |
| Benzoyl Peroxide | 100 milligrams |
| Carbowax 4000 | 1 gram |
| Benzoyl peroxide as initiator | 100 milligrams |

The polymer rod was subsequently fabricated into contact lenses without difficulty using non-aqueous grinding and polishing techniques. Upon hydration the lenses showed an increase of linear dimension of 27.3%.

EXAMPLE XIV

A copolymer was formed using the following components under the same conditions as Example XIII.

| | |
|---|---|
| 2-Hydroxyethyl methacrylate | 9 grams |
| 1,4 butene diol | 1 gram |
| Carbowax 4000 | 1 gram |
| 1,5-divinyloxy-3-oxapentane | 150 milligrams |
| Benzoyl peroxide | 100 milligrams |

Subsequent curing and fabrication gave lenses which on hydration become very tacky and soft with excellent optical properties.

EXAMPLE XV

A copolymer was formed using the following components under the same conditions as Example XIII.

| | |
|---|---|
| 2-Hydroxyethyl methacrylate | 9 grams |
| 4-Hydroxybutyl vinyl ether | 1 gram |
| 1,5-divinyloxy-3-oxapentane | 100 milligrams |
| Carbowax 4000 | 1 gram |
| Benzoyl peroxide | 100 milligrams |

Fabrication of a lens after curing and subsequent hydration gave a soft lens which increased 24% in linear dimension.

EXAMPLE XVI

A copolymer was formed using the following components under the same conditions as Example XIII.

| | |
|---|---|
| 2-Hydroxyethyl methacrylate | 9 grams |
| Vinyl formate | 1 gram |
| 1,5-divinyloxy-3-oxapentane | 150 milligrams |
| Carbowax 4000 | 1 gram |
| Benzoyl peroxide | 100 milligrams |

Subsequent fabrication gave lens which on hydration showed an increase in linear dimensions of 19%.

EXAMPLE XVII

A copolymer was formed using the following components under the same conditions as Example XIII.

| | |
|---|---|
| 2-Hydroxyethyl methacrylate | 9 grams |
| Tetrahydrofurfuryl methacrylate | 1 gram |
| 1,5-divinyloxy-3-oxapentane | 150 milligrams |
| Carbowax 4000 | 1 gram |
| AIBN | 100 milligrams |

Further curing at 60°C. for 24 hours and subsequent fabrication gave a lens which on hydration resulted in a soft lens which increased 20% in linear dimensions.

EXAMPLE XVIII

A copolymer was formed using the following components under the same conditions as Example XIII.

| | |
|---|---|
| 2-Hydroxyethyl methacrylate | 8 grams |
| Monomethylether polyethylene glycol-350 methacrylate | 2 grams |
| Polyethyleneglycol-400 dimethacrylate | 150 milligrams |
| Carbowax 4000 | 1 gram |
| AIBN | 100 milligrams |

Further curing at 60°C. for 10 hours and subsequent fabrication gave a lens which on hydration resulted in a soft lens which increased 24% in linear dimensions.

EXAMPLE XIX

A terpolymer was formed using the following components under the same conditions as Example XIII.

| | |
|---|---|
| 2-Hydroxyethyl methacrylate | 10 grams |
| Methoxyethyl methacrylate | 1 gram |
| Methyl methacrylate | 1 gram |
| 1,5-divinyloxy-3-oxapentane | 150 milligrams |
| Benzoyl peroxide | 100 milligrams |
| Carbowax 4000 | 1 gram |

Further curing at 60°C. for 10 hours and subsequent fabrication and hydration gave a lens in which the increase in linear dimension upon hydration was 26%.

EXAMPLE XX

A terpolymer was formed using the following components under the same conditions as Example XIII.

| | |
|---|---|
| 2-Hydroxyethyl methacrylate | 10 grams |
| Methoxyethyl methacrylate | 1 gram |
| Tetrahydrofurfuryl methacrylate | 1 gram |
| 1,5-divinyloxy-3-oxapentane | 100 milligrams |
| Benzoyl peroxide | 100 milligrams |
| Carbowax 4000 | 1 gram |

Curing and subsequent fabrication gave a lens which on hydration resulted in a soft lens in which the increase in linear dimension upon hydration was 26%.

EXAMPLE XXI

A terpolymer was formed using the following components under the same conditions as Example XIII.

| | |
|---|---|
| 2-Hydroxyethyl methacrylate | 9 grams |
| Methoxyethyl methacrylate | 1 gram |
| 4-Hydroxybutyl vinyl ether | 1 gram |
| 1,5-divinyloxy-3-oxapentane | 100 milligrams |
| Carbowax 4000 | 1 gram |
| Benzoyl peroxide | 100 milligrams |

Curing and fabrication resulted in a lens which on hydration resulted in an excellent flexible elastic soft lens. The hydration of the lens caused it to increase in linear dimensions 29%.

EXAMPLE XXII

A terpolymer was formed using the following components under the same conditions as Example XIII.

| | |
|---|---|
| 2-Hydroxyethyl methacrylate | 8 grams |
| Hydroxypropyl methacrylate | 2 grams |
| 4-Hydroxybutyl vinyl ether | 1 gram |
| 1,5-divinyloxy-3-oxapentane | 100 milligrams |
| Polyethylene glycol | 1 gram |
| Benzoyl peroxide | 100 milligrams |

Curing and fabrication resulted in a lens which on hydration gave a soft lens in which the linear dimension was increased by 29% due to water absorption.

EXAMPLE XXIII

A copolymer made from the following components as in Example XIII.

| | |
|---|---|
| 2-Hydroxyethyl methacrylate | 8 grams |
| Hydroxypropyl acrylate | 2 grams |
| 1,5-divinyloxy-3-oxapentane | 100 milligrams |
| Carbowax 4000 | 1 gram |
| Benzoyl peroxide | 100 milligrams |

After curing the polymer was fabricated into a lens which on hydration increased in dimension by 30% and gave a tacky soft lens.

EXAMPLE XXIV

One copolymer was made from the following components as in Example X.

| | |
|---|---|
| 2-Hydroxyethyl methacrylate | 10 grams |
| Methoxyethyl methacrylate | 1 gram |
| 1,5-divinyloxy-3-oxapentane | 150 milligrams |
| Benzoyl peroxide | 100 milligrams |
| Carbowax 4000 | 5 grams |

After curing the polymer was fabricated into a lens which on hydration increased in dimension 8% and gave a soft tacky lens.

The composition ranges which have been found effective for the various constituents of the copolymer of this invention are set forth below in Table 2.

TABLE 2

| Constituent | Operative Range | Preferred Range |
|---|---|---|
| Hydroxyalkyl acrylate or methacrylate | 1 – 90% | 5 – 90% |
| Hydrophilic monomers | 10 – 95% | 10 – 90% |
| Hydrophobic monomers | Up to 20% | Up to 10% |
| Cross-linking agent | Up to 20% | 1 – 5% |
| Catalyst | 0.1 – 1.0% | 0.2 – 0.5% |
| Water soluble inert solid substance | a minor amount up to 50% | 5 – 40% |

All percentages expressed as weight percent.

The copolymers having compositions as set forth in Table 2 above find many uses beyond the construction of contact lenses. For example, these copolymers may be used to form many types of prosthetic devices and other devices for implantation into the human body and into the bodies of other animals. Such usage is, of course, dependent upon the lack of a rejection mechanism by the body toward the implant. Such devices would include cardiovascular valve replacement and other cardiovascular equipments, intrauterine devices, denture liners and the like.

In addition, such compositions may find usage as a film forming composition suitable for use as a drag reducing paint, for example, in marine environments. For this purpose a polyethylene polymer or similar substance is incorporated as a water soluble component which would slowly be released into the water to provide a drag reducing surface.

Coatings of the compositions of this invention may be used as a moisture absorbent surface on such articles as the handles of golf clubs and baseball bats, automobile steering wheels and other similar applications in which perspiration from a user's hands makes such surfaces slippery and difficult to grasp firmly.

Examples of hydrophilic vinyl monomers useful in the polymerization systems of this invention include the following:

1. Hydroxyalkyl methacrylates and acrylates with the alkyl groups having from 2 to 6 carbon atoms.
2. N-vinyl lactams namely N-vinyl pyrrolidone, N-vinyl caprolactam and N-vinyl piperidone.
3. Methoxymethyl, methoxyethyl, methoxypropyl, ethoxyethyl, tetrahydrofurfuryl, monomethylether of polyethylene and polypropylene glycol, acrylate and methacrylate.
4. Hydroxyalkyl vinyl ethers with the alkyl groups having 2 to 4 carbon atoms.
5. N,N-dialkyl amino ethyl methacrylates and acrylates with the alkyl groups having from 0 to 2 carbon atoms.
6. N,N-dialkyl acrylamide with the alkyl groups having from 0 to 2 carbon atoms.
7. Alkyl vinyl ketone with the alkyl group having 1 to 2 carbon atoms.
8. N-vinyl imidazole.
9. Vinyl hydroxy acetate, vinyl hydroxy propionate, vinyl hydroxy butyrate.
10. 1-Vinyloxy 2-hydroxyethylene, 1-vinyloxy 5-hydroxy 3-oxapentane, 1-vinyloxy 8-hydroxy 3,6-dioxaoctane, 1-vinyloxy 11-hydroxy 3,6,9-trioxaundecane and 1-vinyloxy 14-hydroxy 3,6,9,12 tetraoxatetradecane.
11. N-vinyl morpholine.
12. N-vinyl succinimide and N-vinyl glutarimide.
13. N-vinyl 3-morpholinone.
14. Any olefinic alcohol or glycol, e.g., allyl alcohol, butenediol.
15. Vinyl methoxy acetate, propionate, butyrate and vinyl formate.
16. Vinyl ethoxy acetate, propionate and butyrate, n-vinyl formate.
17. Methoxy alkyl and alkoxyalkyl vinyl ethers with the alkyl groups having 1 to 4 carbon atoms.

The hydrophobic monomers may be any vinyl monomer containing hydrophobic groups such as methyl-through lauryl-methacrylate, vinyl stearate, etc.

Any two or more of the above monomers may be copolymerized along with the water soluble material and a cross-linking agent to give a suitable material for prosthetic devices.

Examples of water soluble inert substances compatible with the monomers and polymers set forth above, to be incorporated within the polymer matrix include:

1. Polyethylene glycol, polypropylene glycol, polybutylene glycol, M. W. 1,000 to 100,000.
2. Esters and ethers of polyethylene glycols, polypropylene glycol and polybutylene glycol, M. W. 100 to 100,000.
3. Benzoic, toluic, napthoic acids.
4. Polyvinyl pyrrolidone, polyvinyl caprolactam, polyvinyl piperidone.
5. Soaps and surfactants.
6. N-acetyl polyethylene imine.
7. Poly-N-vinyl imidozole, poly-N-vinyl succinimide, poly-N-vinyl glutaramide.

Examples of suitable cross-linking agents for use are:

1. Divinyl ethers of polyethylene and polypropylene glycols.
2. Diacrylates and dimethacrylates of polyethylene, polypropylene and polybutylene glycols.
3. Vinyl acrylate and methacrylate.
4. Allyl acrylate and methacrylate.
5. Triacrylate and trimethacrylate of glycerol.
6. Triallylcyanurate.
7. Olefin glycol dimethacrylates.
8. Allyl diglycol carbonate.
9. Triallylcyanurate.
10. Diallyl carbonates and polyallyl carbonates of dihydroxy or polyhydroxy compounds.
11. Divinyl and polyvinyl carbonates of dihydroxy or polyhydroxy compounds.

The preferred catalyst for use herein is axobisisobutyronitrile. Many other catalysts which induce polymerization and cross-linking may be used with varying degrees of success. For example, various organic peroxides may be used including benzoyl peroxide, chlorobenzoyl peroxide, tertiary butyl peroxy carbonate, lauryl peroxide, etc., and many other peroxides that are soluble in the monomer system may be used.

The composite polymer prosthetic devices made possible by this invention have been described specifically by way of the example of a standard type of contact lens. Special application types of contact lenses such as are used as a means for applying medication may readily be fabricated according to the teachings of this invention. Scleral contact lenses, corneal contact lenses, microlenses and special correction lenses such as those containing an artificial iris, central or peripheral opacity, lenses used in cases of albinism, atrophy of the eye or other conditions can all be constructed according to this invention. The presence of a hydrophilic peripheral area provides wearer comfort in all types of lenses and the gradation of physical characteristics from one portion to another of the lens permits versatility heretofore unknown in contact lens manufacture.

Described herein and claimed below is an invention in the polymeric material used to form polymeric prosthetic devices including such items as contact lenses, body inserts, cardiovascular devices and other appliances which are intended to operate in an aqueous environment in which distortion and stresses between the elements making up such prosthetic devices must be minimized. The polymer composition is also ideally suited for making the conventional soft contact lens devices which are of a consistent composition throughout.

Many modifications to the composition of matter, methods and devices disclosed herein will be readily apparent to those skilled in the arts of polymer chemistry, ophthalmology and related arts and sciences in view of the invention disclosed herein and through an understanding of the appended claims.

I claim:

1. A hydrophilic copolymer and inert material mixture, wherein stress and distortion due to absorption of water of objects composed of said mixture are minimized upon hydration thereof, formed by polymerizing an hydroxyalkyl methacrylate or acrylate with monomers chosen from the group consisting of alkoxyalkyl acrylates and methacrylates in the presence of from 1 - 20% by weight of a suitable cross-linking agent chosen from the group consisting of:
   1. Divinylethers of polyethelylene and polypropylene glycols;
   2. Diacrylates and dimethacrylates of polyethylene, polypropylene and polybutylene glycols;
   3. Vinyl acrylate and methacrylate; and
   4. Allyl acrylate and methacrylate;
      with a polymerization catalyst, there being a minor amount up to 50% by weight of a water soluble inert substance mixed with said hydrophilic monomer or monomers prior to polymerization, said water soluble inert substance chosen from the group consisting of:
   1. Polyethylene glycol, polypropylene glycol, polybutylene glycol, M.W. 1,000 to 100,000;
   2. Esters and ethers of polyethylene glycols, polypropylene glycol and polybutylene glycol, M.W. 100 to 100,000;
   3. Benzoic, toluic, napthoic acids; and
   4. Polyvinyl pyrrolidone, polyvinyl caprolactam, polyvinyl piperidone, whereby said water soluble inert substance may be removed from said polymer by exposure to water.

2. The copolymer of claim 1 wherein said monomers are chosen from the group consisting of methoxymethyl, methoxyethyl, methoxypropyl, methoxybutyl and ethoxyethyl acrylates and methacrylates and mixtures thereof.

3. The copolymer of claim 2 wherein said cross-linking agent is a divinylether of polyethylene or polypropylene glycol.

4. The copolymer of claim 2 wherein said water soluble inert substance is a polyethylene glycol, polybutylene glycol or polypropylene glycol having a molecular weight in the range of 1,000 to 100,000.

5. A hydrophilic copolymer composition, wherein stress and distortion of objects formed from said copolymer are minimized upon hydration thereof, formed by copolymerizing a monomer system containing the following constituents in the approximate relative quantities set forth at a temperature less than about 45°C.:

| | | |
|---|---|---|
| 2-Hydroxyethyl methacrylate | 10 | parts |
| Methoxyethyl methacrylate | 1 | part |
| 1,5-divinyloxy-3-oxapentane | 0.15 | part |
| Benzoyl peroxide | 0.10 | part |
| [Polyoxyethylene] Polyethylene glycol of molecular weight about 4000 | A minor amount up to 4 parts | | whereby said polyethylene glycol is substantially unreacted with said copolymer and extractable by exposure to water.

6. A method of reducing stress and distortion in a hydrophilic polymer matrix due to absorption of water into the polymer matrix comprising mixing into a monomer system consisting essentially of:

| | |
|---|---|
| Hydroxyalkyl acrylate or methacrylate (alkyl group containing from 2 to 6 carbon atoms) | 5 to 90% |
| Alkoxyalkyl acrylate or methacrylate (alkyl groups containing from 1 to 3 carbon atoms) | 90 to 10% |
| Cross-linking agent chosen from the group consisting of 1-5 divinyloxy-3-oxapentane, ethylene glycol dimethacrylate, polyethylene glycol dimethacrylate, and tetrahydrofurfuryl methacrylate, | 1 to 5% |
| Catalyst chosen from the group consisting of azobis isobutyronitrile and benzoyl peroxide | 0.2 to 0.5% | a minor amount up to 50% by weight of a water soluble inert substance compatible with said monomer system, polymerizing said monomer system to a hydrophilic polymer and exposing said polymer to water whereby at least a portion of said water soluble inert substance is dissolved into said water and said polymer is hydrated.

7. The method of claim 6 wherein said soluble inert substance is chosen from the group consisting of:
   1. Polyethylene glycol, polypropylene glycol, polybutylene glycol, M. W. 1,000 to 100,000;
   2. Esters and ethers of polyethylene glycols, polypropylene glycol and polybutylene glycol, M. W. 100 to 100,000;
   3. Benzoic, toluic, napthoic acids; and
   4. Polyvinyl pyrrolidone, polyvinyl caprolactam, polyvinyl piperidone.

8. A relatively unstressed hydrophilic copolymer of terpolymer composition containing about 5 to 40% by weight water, the polymer portion thereof formed by polymerization of a mixture comprising:
- from 1 to 90% by weight of hydroxyalkyl acrylate or methacrylate the alkyl group thereof having from two to six carbon atoms therein;
- from 99 to 10% by weight of a hydrophilic vinyl monomer chosen from the group consisting of methoxymethyl, methoxyethyl, methoxypropyl, methoxybutyl and ethoxyethyl acrylates and methacrylates and mixtures thereof; and
- up to 20% by weight of a cross-linking agent; wherein said mixture contained, prior to polymerization, a minor amount up to 50% by weight of a water soluble inert substance which was substantially removed upon exposure of said polymer portion to water during hydration whereby changes in dimensions of shapes formed from said polymer due to hydration are minimized.

9. The polymer composition of claim 8 wherein said water soluble inert substance is chosen from the group consisting of polyethylene glycol, polypropylene glycol, and polybutylene glycol having a molecular weight in the range of 1000 to 100,000.

10. The polymer composition of claim 8 wherein said water soluble inert substance is chosen from the group consisting of:
1. Polyethylene glycol, polypropylene glycol, polybutylene glycol, M.W. 1,000 to 100,000;
2. Esters and ethers of polyethylene glycols, polypropylene glycol and polybutylene glycol, M.W. 100 to 100,000;
3. Benzoic, toluic, naphthoic acids; and
4. Polyvinyl pyrrolidione, polyvinyl caprolactam, polyvinyl piperidone.

11. A hydrated hydrophilic copolymer composition, wherein stress and distortion of objects due to hydration formed from said copolymer are minimized, formed by copolymerizing a monomer system containing the following constituents in the approximate relative quantities set forth:

| | |
|---|---|
| 2-Hydroxyethyl methacrylate | 10 parts |
| Methoxyethyl methacrylate | 1 part |
| 1,5-Divinyloxy-3-oxapentane | 0.15 part |
| Benzoyl peroxide | 0.10 part | said copolymer composition containing a minor amount up to about 4 parts by weight of a polyethylene glycol having a molecular weight of about 4000, said polyethylene glycol being substantially removed from said copolymer by leaching with water during hydration whereby changes in dimensions of said objects due to hydration are minimized.

12. The method of claim 6 wherein said polymerization temperature is in the range of from about 40°C. to about 45°C.

13. The method of claim 6 wherein said hydrophilic polymer is formed by polymerizing a monomer system consisting essentially of:

| | |
|---|---|
| Hydroxyalkyl acrylate or methacrylate (alkyl group containing from 2 to 6 carbon atoms) | 5 to 90% |
| Alkoxyalkyl acrylate or methacrylate (alkyl groups containing from 1 to 3 carbon atoms) | 90 to 10% |
| Cross-linking agent chosen from the group consisting of 1-5 divinyloxy-3-oxapentane, ethylene glycol dimethacrylate, polyethylene glycol dimethacrylate, tetrahydrofurfuryl methacrylate, and hydroxybutyl vinyl ether | 1 to 5% |
| Catalyst chosen from the group consisting of azobisisobutyronitrile and benzoyl peroxide | 0.2 to 0.5%. |

14. A hydrophilic resin and inert material composition having a substantial portion thereof soluble in water and removable from said composition by exposure to water obtained by mixing together essentially only a hydroxyalkyl acrylate or methacrylate and a hydrophilic vinyl monomer chosen from the group consisting of alkoxyalkyl acrylates and methacrylates in the presence of an inert sybstance chosen from the group consisting of polyethylene glycol, polypropylene glycol and polybutylene glycol, having a molecular weight in the range of 1,000 to 100,000 at a polymerization temperature below 45°C., polymerizing said mixture in the presence of a polymerization catalyst whereby said inert substance is substantially unincorporated in said polymer by chain transfer and is removable therefrom by exposure of said resin composition to water.

* * * * *